(12) United States Patent
Koga

(10) Patent No.: US 11,368,897 B2
(45) Date of Patent: Jun. 21, 2022

(54) COMMUNICATION APPARATUS, CONTROL METHOD, AND STORAGE MEDIUM

(71) Applicant: CANON KABUSHIKI KAISHA, Tokyo (JP)

(72) Inventor: Kazuhiro Koga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/883,341

(22) Filed: May 26, 2020

(65) Prior Publication Data

US 2020/0383032 A1    Dec. 3, 2020

(30) Foreign Application Priority Data

May 30, 2019    (JP) .............................. JP2019-101147

(51) Int. Cl.
*H04W 40/24*    (2009.01)
*H04W 40/20*    (2009.01)
*H04W 76/20*    (2018.01)

(52) U.S. Cl.
CPC ......... *H04W 40/244* (2013.01); *H04W 40/20* (2013.01); *H04W 76/20* (2018.02)

(58) Field of Classification Search
CPC .................................................... H04W 76/20
See application file for complete search history.

(56) References Cited

U.S. PATENT DOCUMENTS

2009/0161600 A1\* 6/2009 Sato ...................... H04W 28/06
                                                                370/328
2020/0383032 A1\* 12/2020 Koga .................... H04W 40/20

FOREIGN PATENT DOCUMENTS

EP            3144914 A1    3/2017
JP         2007-122161 A    5/2007

\* cited by examiner

*Primary Examiner* — Jamal Javaid
(74) *Attorney, Agent, or Firm* — Canon U.S.A., Inc. IP Division

(57) ABSTRACT

A communication apparatus receives a notification based on setting information from a first other communication apparatus, and performs control in such a manner that a second other communication apparatus can start a notification based on this setting information based on the fact that it is confirmed that the communication with the first other communication apparatus is not maintained in a case where the first other communication apparatus is replaced with the second other communication apparatus.

17 Claims, 8 Drawing Sheets

| Name | Node ID | Device Status | Power Source | Wake Interval (sec) | Last Wake Time | Setting Reflection Mode |
|---|---|---|---|---|---|---|
| Multi-Sensor-A | 0x02 | Sleep | Battery | 480 | 2018/12/20 09:28:30 | Reflection after determination about existence |
| Power Plug-P | 0x03 | Wake | AC | --- | --- | Immediate reflection |

| Name | Node ID | Temp Alert (°C) | Humidity Alert (%) |
|---|---|---|---|
| Multi-Sensor-A | 0x02 | 35 | 80 |

_401_  _402_  _403_  _404_

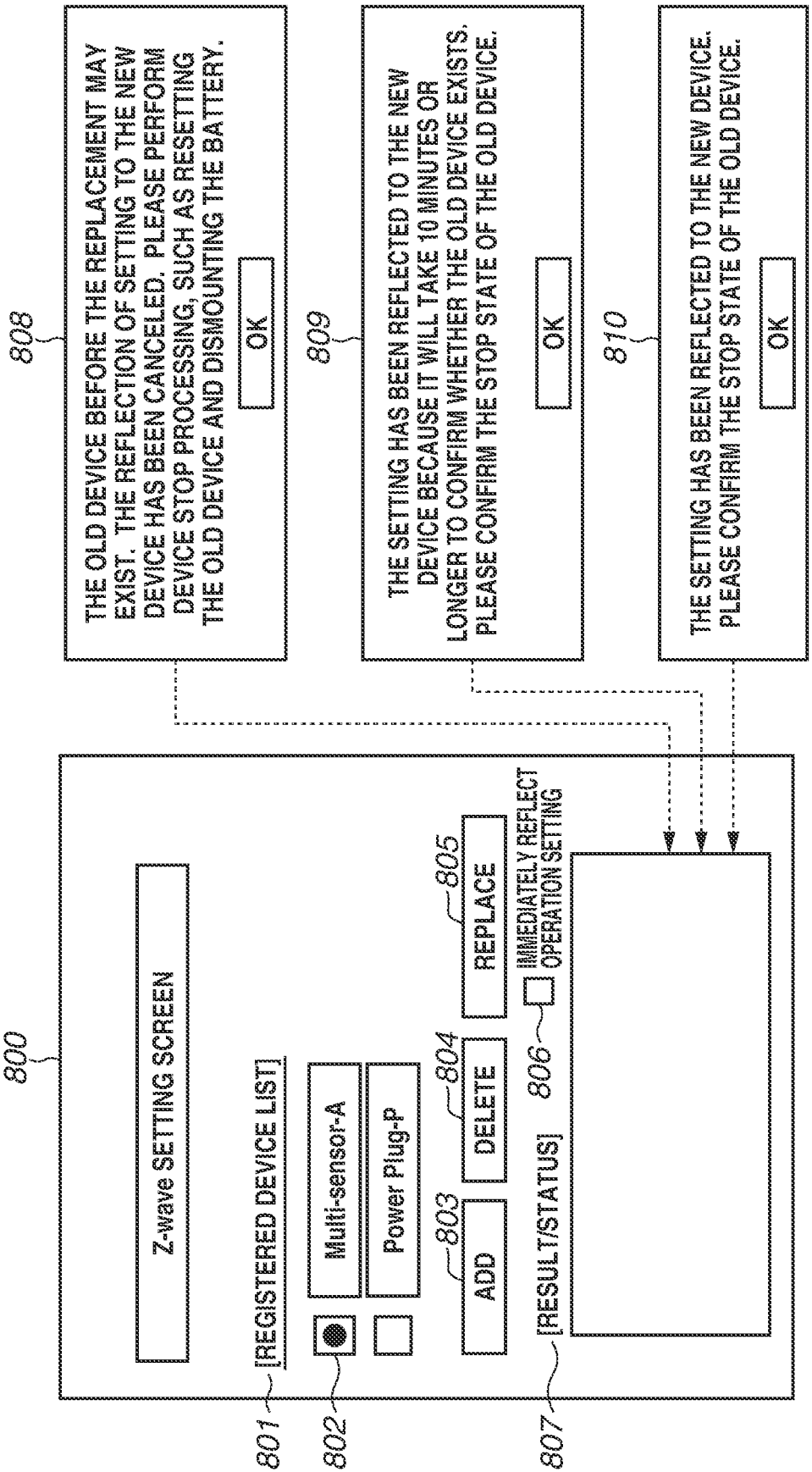

COMMUNICATION APPARATUS, CONTROL METHOD, AND STORAGE MEDIUM

BACKGROUND OF THE INVENTION

Field of the Invention

The present invention relates to a communication apparatus that receives a notification from another communication apparatus.

Description of the Related Art

There is a standard called Z-Wave as a communication standard for a wireless network that collects sensor data from a communication apparatus having a sensor function. In such a wireless network, the communication apparatus having the sensor function (a slave device) transmits a notification to a master device according to a condition preset by the apparatus that collects the sensor data (the master device).

The slave device is expected to be replaced from an old slave device to a new slave device due to a cause such as battery exhaustion and a failure. According to the Z-Wave standard, a setting of the old slave device can be transferred to the new slave device when the slave device is replaced. More specifically, settings such as an identification (ID) assigned to the old slave device by the master device, and a setting regarding the notification can be transferred to the new slave device. The Z-Wave standard defines that the settings can be transferred to the new slave device when the old slave device is in a Sleep state or a Dead state. The Sleep state refers to a state in which the slave device temporarily stops the communication to reduce the consumption of the battery, and the Dead state refers to a state in which the communication is not maintained and the existence of the slave device can no longer be confirmed.

Japanese Patent Application Laid-Open No. 2007-122161 discusses backing up setting information of a printer in advance, and updating information incompatible with a new printer, among the backed up setting information, when the printer is replaced.

The settings of the old slave device are transferred to the new slave device according to the Z-Wave standard when the slave device is replaced, which makes it impossible to determine whether the new slave device transmits the sensor data or the old slave device transmits the sensor data if the old slave device ever transmits the sensor data after the slave device is replaced. Therefore, if the communication is maintained between the old slave device and the master device even after the slave device is replaced and the master device is notified of the sensor data from the old slave device, the master device may undesirably perform control based on the sensor data which the master device is notified of by the old slave device.

SUMMARY OF THE INVENTION

The present invention is directed to preventing a communication apparatus from receiving a notification from a first other communication apparatus when the first other communication apparatus in communication with the communication apparatus is replaced with a second other communication apparatus and a notification from the second other communication apparatus is started.

According to an aspect of the present invention, a communication apparatus includes a first reception unit configured to receive a notification based on setting information from a first other communication apparatus in communication with the communication apparatus, a confirmation unit configured to confirm whether the communication with the first other communication apparatus is maintained, and a control unit configured to, in a case where the first other communication apparatus is replaced with a second other communication apparatus different from the first other communication apparatus, perform control in such a manner that the second other communication apparatus can start a notification based on the setting information based on the fact that the confirmation unit confirms that the communication with the first other communication apparatus is not maintained.

Further features of the present invention will become apparent from the following description of exemplary embodiments with reference to the attached drawings.

BRIEF DESCRIPTION OF THE DRAWINGS

FIG. 1 illustrates a configuration of a communication system which a network camera participates in.

FIG. 3 illustrates an example of a device management table stored in the network camera.

FIG. 4 illustrates an example of a device operation setting table stored in the network camera.

FIG. 8 illustrates an example of a setting screen regarding the network camera.

DESCRIPTION OF THE EMBODIMENTS

An exemplary embodiment will be described in detail with reference to the accompanying drawings. A configuration that will be described in the following exemplary embodiment is merely an example, and the present invention shall not be limited to the illustrated configuration.

Figure 1:
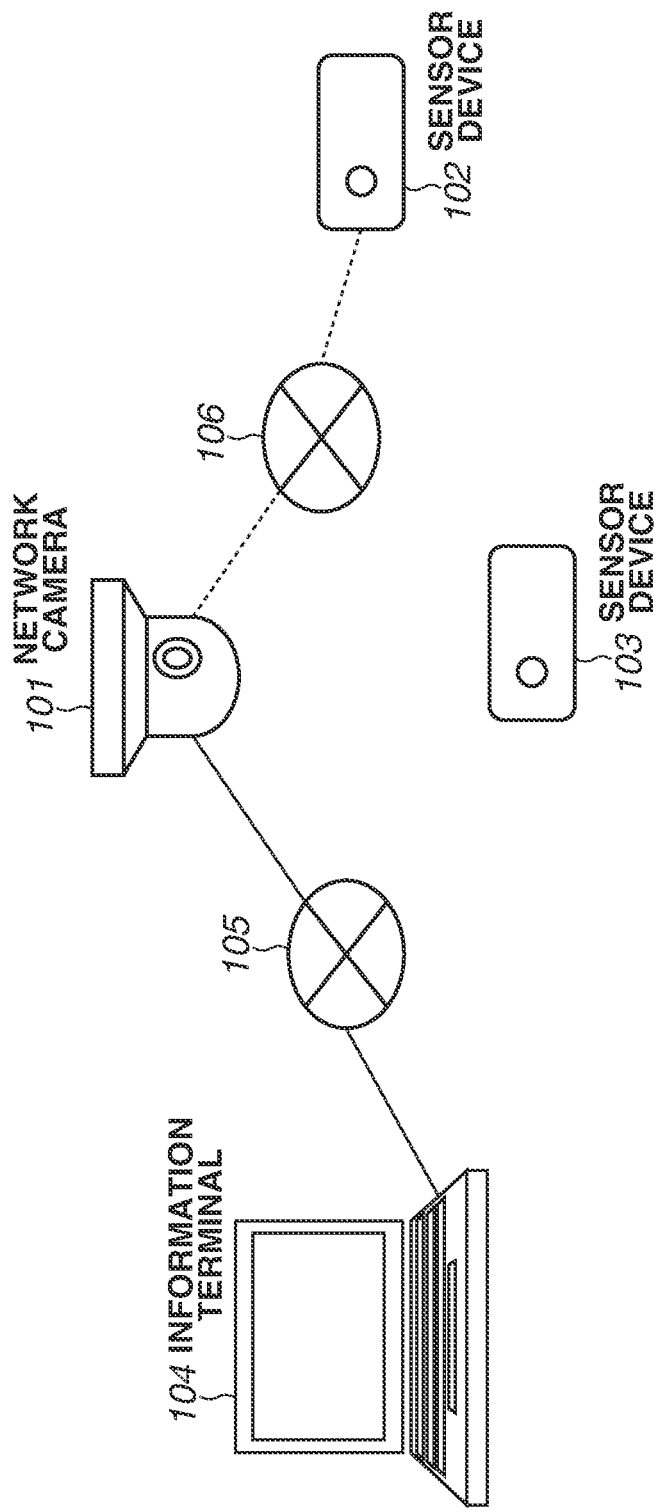

FIG. 1 illustrates a configuration of a communication system which a network camera 101 participates in. The communication system illustrated in FIG. 1 includes the network camera 101, a sensor device 102, a sensor device 103, and an information terminal 104. The network camera 101 can communicate with the information terminal 104 via a network 105. Further, the network camera 101 can communicate with the sensor device 102 via a network 106.

The network camera 101 is a camera having an imaging function, and can distribute a captured image or video image to the information terminal 104 via the wired or wireless network 105. Further, a setting of the network camera 101 regarding imaging such as an angle of view, a pan, and a tilt can be configured using the information terminal 104 that communicates with the network camera 101 via the wired or wireless network 105. Further, in addition thereto or instead thereof, a setting regarding the communication with the network camera 101 and the like can be configured.

The network 105 may be a network based on wired communication in compliance with a wired communication method such as a wired local area network (LAN) or may be a network based on wireless communication in compliance with a wireless communication method such as the Institute of Electrical and Electronics Engineers (IEEE) 802.11 series standards. In this case, the network camera 101 may operate as an access point that constructs the network 105 or may operate as a station that participates in the network 105 constructed by the information terminal 104 or a not-illustrated access point. The network 105 may be a network in compliance with a wireless communication method such as the Wireless Fidelity (Wi-Fi) Direct standard and the Wi-Fi Neighbor Awareness Networking (NAN) standard. Alternatively, the network 105 may be a network in compliance with a wireless communication method such as Bluetooth®, Near Field Communication (NFC), Ultra Wide Band (UWB), Multi Band OFDM (Orthogonal Frequency Division Multiplexing) Alliance (MBOA), ZigBee, Z-Wave, and the like, instead of the IEEE 802.11 series standards. UWB includes wireless universal serial bus (USB), wireless 1394, WiNET, and the like.

The sensor devices 102 and 103 are sensors capable of measuring a temperature, a humidity, an illuminance, and transmit a notification to the network camera 101 according to a preset condition. The sensor devices 102 and 103 can notify the network camera 101 of numerical data such as the temperature and the humidity, and can also notify the network camera 101 or the like of control information for controlling another apparatus in addition to or instead of the numerical data. For example, in a case where the sensor device 102 is a sensor capable of measuring the temperature, the sensor device 102 can be set so as to notify the network camera 101 of the measured temperature if a predetermined temperature or higher is measured. Alternatively, in a case where the sensor 102 is a sensor capable of measuring the temperature, the sensor device 102 can also be set so as to notify the network camera 101 or the like of the control information for powering on a not-illustrated air conditioner communicable via the network 106 if a predetermined temperature or higher is measured.

A condition based on which the sensor device 102 issues the notification can be set by a user by using the information terminal 104 that communicates with the network camera 101 via the network 105. Alternatively, the user may be able to set the condition using a not-illustrated information terminal communicable via the network 106. Alternatively, the user may be able to set the condition using a not-illustrated information terminal that directly wirelessly communicates with the sensor device 102 without the intervention of the network camera 101.

The network 106 is a network based on wireless communication using a wireless communication method in compliance with the Z-Wave standard. In this case, the sensor device 102 can notify the network camera 101 by using a profile defined by the Z-Wave standard. The network 106 may be a network based on wireless communication using a wireless communication method in compliance with the Wi-Fi NAN standard or the ZigBee standard instead of the Z-Wave standard. The network 106 may be any network that allows the sensor device 102 to notify another apparatus, such as the network camera 101, with which the sensor device 102 communicates via the network 106 according to the preset condition.

In the case where the sensor device 102 notifies the network camera 101, the network camera 101 manages, as a master device, communication information regarding the communication with the sensor device 102 serving as a slave device and setting information regarding the notification that the sensor device 102 issues. Examples managed as the communication information include information regarding an interval at which the sensor device 102 transmits a notification for confirming the existence. Further, examples managed as the setting information include information regarding the condition based on which the sensor device 102 issues the notification and the content of the notification. Details of the communication information and details of the setting information will be described with reference to FIGS. 3 and 4, which will be described below, respectively. The network camera 101 assigns a node identification (a node ID) to each of managed slave devices, and manages the communication information and the setting information in association with this ID.

In the Z-Wave standard, the communication information and the setting information of an old slave device can be transferred to a new slave device when the slave device is replaced. For example, if a failure has occurred or the battery runs down in the slave device, the slave device is replaced with the new slave device having a similar function, and the communication information and the setting information of the old slave device can be transferred to the new slave device. In the present exemplary embodiment, for example, the sensor device 102 in communication with the network camera 101 is replaced with the sensor device 103, and the communication information and the setting information of the sensor device 102 can be transferred to the sensor device 103. More specifically, the communication information and the setting information are transferred to the new slave device by the master device reassigning the node ID that used to be assigned to the old slave device to the new slave device. When the communication information and the setting information are transferred, the master device can correct information different between the old slave device and the new slave device regarding the communication information and the setting information.

The communication information and the setting information of the old slave device are transferred to the new slave device when the slave device is replaced in this manner, which makes it impossible to determine whether the transmission source of the notification is the old slave device or the new slave device in a case where the master device ever receives the notification from the old slave device after the slave device is replaced. As a result, the master device may issue a notification based on the notification transmitted from the old slave device.

In the present exemplary embodiment, the master device performs control in such a manner that the new slave device starts the notification after confirming that the communication with the old slave device is not maintained when the slave device is replaced. More specifically, the setting information is transferred to the new slave device in such a manner that the new slave device starts issuing the notification based on the fact that the notification for confirming the existence is not received from the old slave device even when a predetermined period comes, when the slave device is replaced. The communication apparatus according to the present exemplary embodiment can be prevented from receiving the notification from the old slave device after the notification from the new slave device is started, by allowing the new slave device to start issuing the notification after confirming that the communication apparatus is in a state where the notification from the old slave device is no longer received, when the slave device is replaced. Consequently, the communication apparatus according to the present exemplary embodiment can be prevented from performing control based on the notification from the old slave device after the slave device is replaced.

The network camera 101 has been described as communicating with the information terminal 104 via the network 105 and communicating with the sensor device 102 via the network 106 in the present exemplary embodiment, but is not limited thereto and may communicate with both these apparatuses via the same network.

Further, the communication carried out via the network 105 and the communication carried out via the network 106 may be communication in compliance with communication standards different from each other or may be communication in compliance with the same communication standard.

Further, the network camera 101 has been described as communicating with the sensor device 102 or the sensor device 103 in the present exemplary embodiment, but is not limited thereto and may be configured to communicate with a plurality of sensor devices in parallel. Further, the network camera 101 may communicate with sensor devices having various functions in parallel.

Figure 2:
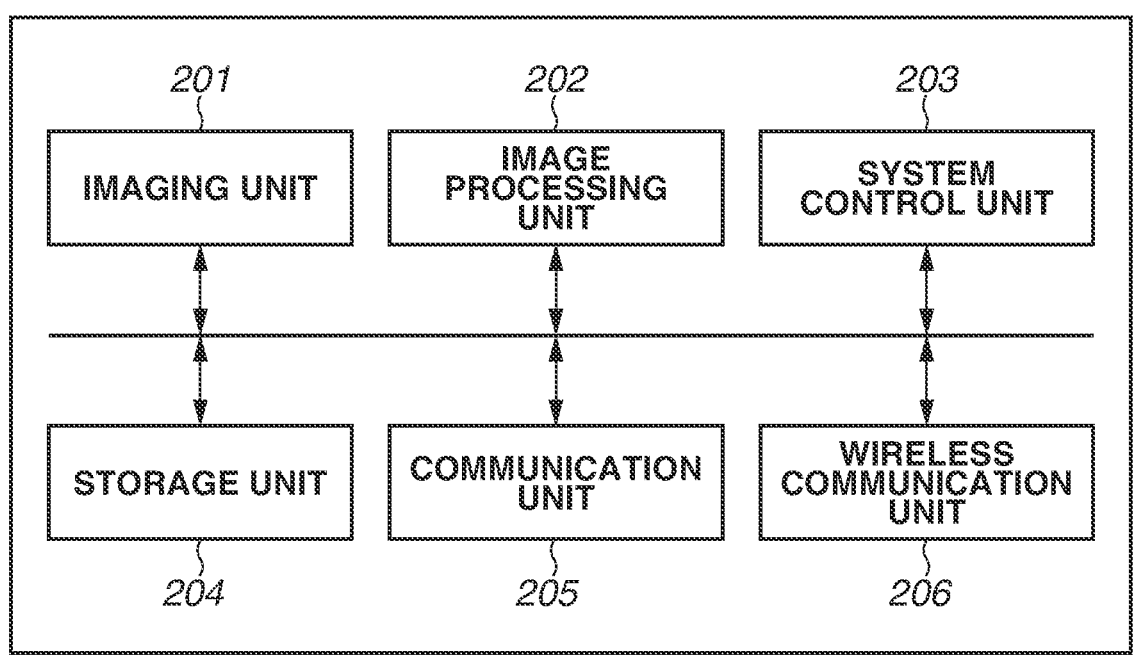
FIG. 2 illustrates a hardware configuration of the network camera.

FIG. 2 illustrates a hardware configuration of the network camera 101. The network camera 101 includes an imaging unit 201, an image processing unit 202, a system control unit 203, a storage unit 204, a communication unit 205, and a wireless communication unit 206.

The imaging unit 201 includes a lens and an image sensor, and images a subject and converts the imaged data into an electric signal as imaging processing.

The image processing unit 202 performs image processing and compression/coding processing on the electric signal converted by the imaging unit 201, thereby generating image data and video data.

The system control unit 203 includes one or more processors such as a central processing unit (CPU) and a micro processing unit (MPU), and controls the entire network camera 101 by executing a program stored in the storage unit 204, which will be described below. The system control unit 203 may be configured to control the entire network camera 101 based on cooperation between the computer program stored in the storage unit 204 and an operating system (OS). Further, the system control unit 203 may include a plurality of processors such as a multi-core processor, and be configured to control the entire network camera 101 by the plurality of processors.

The system control unit 203 analyzes a command transmitted to the network camera 101 and performs processing according to the command. For example, the system control unit 203 can receive a command according to an instruction input by the user via the information terminal 104 from the information terminal 104, and perform processing based on the received command. Further, the system control unit 203 detects a change in an internal parameter stored in the network camera 101 and performs processing triggered by the detection operation as an event trigger. For example, when a change is made to information indicating the state of the sensor device 102, which is stored in the network camera 101, the system control unit 203 can perform processing according to the detection of this change.

The storage unit 204 includes one or more memories such as a read only memory (ROM) and a random access memory (RAM), and stores therein a computer program for performing various kinds of operations and various kinds of information such as a communication parameter for the wireless communication. Examples usable as the storage unit 204 include storage media such as a flexible disk, a hard disk, an optical disk, a magneto-optical disk, a compact disk (CD)-ROM, a CD recordable (CD-R), a magnetic tape, a non-volatile memory card, and a digital versatile disk (DVD), besides the memory such as the ROM and the RAM. Further, the storage unit 204 may include a plurality of memories or the like.

The communication unit 205 controls the communication via the wired LAN or the wireless LAN. More specifically, the communication unit 205 controls the communication via the network 105.

The wireless communication unit 206 controls the communication in compliance with the Z-Wave standard. More specifically, the communication unit 206 controls the communication via the network 106.

The network camera 101 has been described as including the communication unit 205 and the wireless communication unit 206 separately in the present exemplary embodiment, but may control the communication via the network 105 and the communication via the network 106 using one communication unit.

FIG. 3 illustrates an example of a device management table stored in the network camera 101 as the communication information.

A device management table 300 is a table for managing the information about the communication with the sensor device serving as the slave device, and is stored in the storage unit 204 of the network camera 101. The network camera 101 performs processing such as registering and deleting the slave device, and causing the setting to be transferred when the slave device is replaced, using this device management table 300.

A Name 301, a Node ID 302, a Device Status 303, a Power Source 304, and a Wake Interval 305 are stored in the device management table 300 as the communication information. Further, a Last Wake Time 306 and a setting reflection mode 307 are stored in addition thereto. The communication information does not have to include all of these pieces of information, and may include a part thereof instead. Further, the communication information can suffice as long as it includes at least the Node ID 302 as the communication information transferred from the old slave device to the new slave device.

The Name 301 is information indicating the name of the sensor device. The name of the sensor device includes at least any one of a character, a number, and a symbol. The network camera 101 stores the Name 301 based on the information transmitted from the sensor device. Alternatively, the network camera 101 may store information generated by the network camera 101 when the sensor device is registered. Alternatively, the user may set an arbitrary name via the information terminal 104.

The Node ID 302 is information indicating the ID for identifying the sensor device, and a value unique in the network 106 is assigned thereto. When a new sensor device is registered, the network camera 101 assigns a new ID to the registered sensor device. In a case where the sensor device is replaced, the network camera 101 can assign the same ID as the sensor device before the replacement to the sensor device after the replacement. The communication information and the setting information for each sensor device are associated based on the Node ID 302. The setting information will be described below.

The Device Status 303 is information indicating the state of the sensor device. More specifically, the Device Status 303 includes information indicating whether the sensor device is in a Wake state, a Sleep state, or a Dead state. The Wake state refers to a state in which the sensor device can carry out the communication via the network 106. Further, the Sleep state refers to a state in which the sensor device temporarily prohibits itself from carrying out the communication via the network 106 for power saving. Further, the Dead state refers to a state in which the communication with the sensor device is not maintained and the existence of the sensor device cannot be confirmed. The sensor device transmits a notification indicating the existence of the device itself to the network camera 101 serving as the master device per predetermined period. If the network camera 101 does not receive the notification indicating the existence from the sensor device a predetermined number of times or for the predetermined period, the network camera 101 determines that this sensor device is in the Dead state. The network camera 101 determines the state of the sensor device and updates the Device Status 303 per predetermined time period. Alternatively or in addition, the network camera 101 may update the Device Status 303 in response to receipt of the notification from the sensor device.

The Power Source 304 is information indicating a method for supplying electric power to the sensor device. For example, in a case where the sensor device is an apparatus that runs on a battery such as an electric cell, information "Battery" is stored. Alternatively, in a case where the sensor device is a device that runs on an alternating-current (AC) power source, information "AC" is stored. The network camera 101 stores the Power Source 304 based on information received from the sensor device. Alternatively, the network camera 101 may store the Power Source 304 based on information input by the user via the information terminal 104.

The Wake Interval 305 is information indicating a wakeup cycle of the sensor device, and information indicating a cycle based on which the sensor device wakes up from the Sleep state and transmits the notification indicating the existence. For example, in the present exemplary embodiment, the sensor device identified by a node ID of 0x02 transitions from the Sleep state to the Wake state and transmits the notification indicating the existence to the network camera 101 per cycle of 480 seconds. The network camera 101 sets a value preset to the sensor device as the Wake Interval 305. Alternatively or in addition to this, the network camera 101 may determine the Wake Interval 305. Alternatively, the user may arbitrarily set the Wake Interval 305 via the information terminal 104.

The Last Wake Time 306 is information indicating a time when the sensor device has transitioned to the Wake state last time. The network camera 101 sets the time at which the notification indicating the existence has been received from the sensor device as the Last Wake Time 306.

The setting reflection mode 307 is information indicating a timing at which the setting information is transferred when the sensor device is replaced. The setting information refers to information indicating the condition for causing the sensor device to issue the notification, and the type of the notification to be issued. The sensor device for which the setting information is set issues the notification to the network camera 101 based on the condition indicated by the setting information. In the present exemplary embodiment, two modes, namely, an immediate reflection mode and a mode of reflection after the determination about the existence of the old device are prepared as the setting reflection mode 307. In the immediate reflection mode, the network camera 101 causes the setting information to be transferred to the new device without confirming whether the old device exists. On the other hand, in the mode of reflection after the determination about the existence, the network camera 101 causes the setting information to be transferred to the new device after confirming that the old device does not exist. The network camera 101 determines the mode to be set based on other communication information. For example, the network camera 101 may select the mode of reflection after the determination about the existence for the sensor device corresponding to the Power Source 304 indicating Battery, and select the immediate reflection mode for the sensor device corresponding to the Power Source 304 indicating AC. Alternatively, for example, the network camera 101 may select the immediate reflection mode for the sensor device corresponding the Device Status 303 indicating the Dead state. Alternatively, the user may set the setting reflection mode 307 via the information terminal 104.

FIG. 4 illustrates an example of a device operation setting table stored in the network camera 101 as the setting information.

A device operation setting table 400 is a table for managing the setting information of the sensor device serving as the slave device, and is stored in the storage unit 204 of the network camera 101. The network camera 101 manages which slave device issues a notification under what condition to the master device using this device operation setting table 400. In the present exemplary embodiment, the device operation setting table 400 will be described citing, as an example thereof, a device operation setting table for managing the setting information regarding the sensor device that measures the temperature and the humidity and notifies the master device of an abnormality according to a change in the temperature or a change in the humidity.

A Name 401, a Node ID 402, a Temp Alert 403, and a Humidity Alert 404 are stored in the device operation setting table 400 as the setting information. The Name 401 does not have to be included in the setting information.

The Name 401 is information indicating the name of the sensor device. The name of the sensor device includes at least any one of a character, a number, and a symbol. The network camera 101 stores the Name 401 based on the information transmitted from the sensor device. Alternatively, the network camera 101 may store information generated by the network camera 101 when the sensor device is registered. Alternatively, the user may set an arbitrary name via the information terminal 104. For the slave device same as the slave device registered with the device management table 300 illustrated in FIG. 3, the same name is stored in the Name 301 illustrated in FIG. 3 and the Name 401 illustrated in FIG. 4.

The Node ID 402 is information indicating the ID for identifying the sensor device, and a value unique in the network 106 is assigned as it. When a new sensor device is registered, the network camera 101 assigns a new ID to the registered sensor device. When the sensor device is replaced, the network camera 101 can assign the same ID as the sensor device before the replacement to the sensor device after the replacement. The communication information and the setting information for each sensor device are associated based on the Node ID 402. For the same slave device as the slave device registered with the device management table 300 illustrated in FIG. 3, the same ID is stored in the Node ID 302 illustrated in FIG. 3 and the Node ID 402 illustrated in FIG. 4.

The Temp Alert 403 and the Humidity Alert 404 are items for managing the condition based on which the sensor device serving as the slave device notifies the network camera 101 serving as the master device.

The Temp Alert 403 is information indicating a threshold value based on which the sensor device notifies the network camera 101 serving as the master device of the change in the temperature. In the present exemplary embodiment, in a case where the sensor device measures a temperature that meets the threshold value set in the Temp Alert 403, the sensor device notifies the network camera 101 serving as the master device of the fact as a temperature abnormality. For example, if 35 is set as the value of the Temp Alert 403, the sensor device notifies the network camera 101 serving as the master device of the temperature abnormality when the sensor device measures 35 degrees as the temperature.

The Humidity Alert 404 is information indicating a threshold value based on which the sensor device notifies the network camera 101 serving as the master device of the change in the humidity. In the present exemplary embodiment, in a case where the sensor device measures a humidity that meets the threshold value set in the Humidity Alert 404, the sensor device notifies the network camera 101 serving as the master device of the fact as a humidity abnormality. For example, if 80 is set as the value of the Humidity Alert 404, the sensor device notifies the network camera 101 serving as the master device of the humidity abnormality when the sensor device measures 80% as the humidity.

Regarding the Temp Alert 403 and the Humidity Alert 404, the item name and the type of the stored information are changed as appropriate according to the function of the sensor device. For example, the network camera 101 may be configured to, in a case where the sensor device is a sensor device capable of measuring an illuminance, the item name can be changed to an Illuminance and a threshold value based on which the slave device notifies the master device of a change in the illuminance can be set.

The notification from the slave device has been described referring to the example in which the slave device notifies the master device of the abnormality according to the change in the temperature or the humidity in the present exemplary embodiment, but is not limited thereto and the slave device may be set so as to notify the master device or another apparatus of the control signal according to the change in the temperature or the humidity. More specifically, the slave device may be set so as to, for example, transmit a control signal for powering on a communicable air conditioner to this air conditioner via the master device according to the change in the temperature or the humidity. The network camera 101 may be configured to manage not only the condition based on which the slave device issues the notification but also the type of the notification that the slave device issues in the device operation setting table 400 in this case. The user can set the type of the notification the slave device issues via the information terminal 104.

Figure 5:
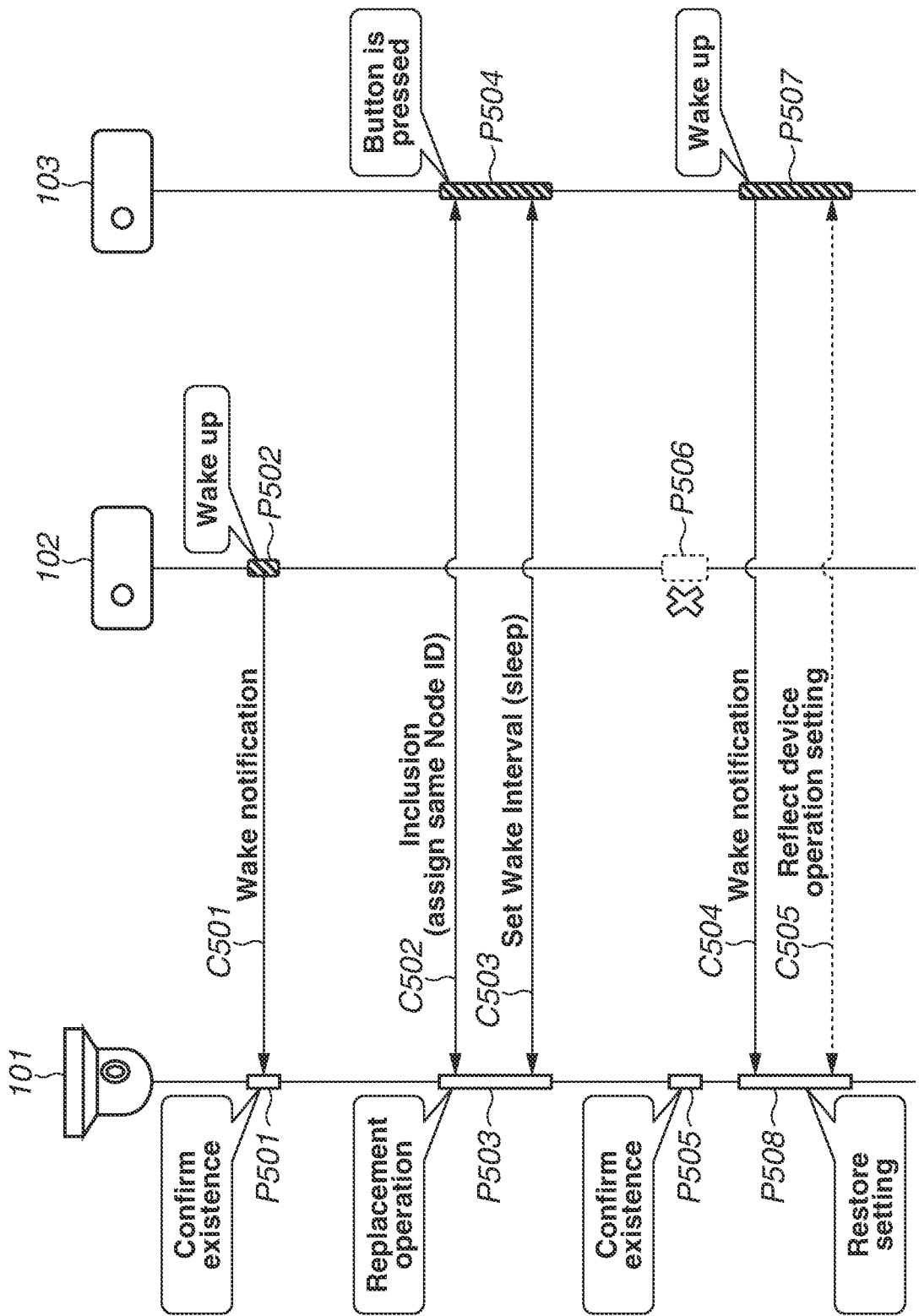
FIG. 5 is a sequence diagram illustrating an example of processing performed by the network camera when a sensor device is replaced with a sensor device.

FIG. 5 is a sequence diagram illustrating an example of processing performed by the network camera 101 when the sensor device 102 is replaced with the sensor device 103.

First, in step P501, the network camera 101 conducts the confirmation of the existence of the sensor device 102. This confirmation of the existence is periodically conducted by the network camera 101 in synchronization with the timing of the wakeup cycle (the Wake Interval) of the sensor device 102. More specifically, the network camera 101 determines whether the notification indicating the existence (a Wake notification) is received from the sensor device 102 within a predetermined time period since the sensor device 102 wakes up, when the Wake Interval of the sensor device 102 is reached. The network camera 101 determines that the sensor device 102 exists if the network camera 101 receives the Wake notification from the sensor device 102, and determines that the sensor device 102 does not exist if the network camera 101 does not receive the Wake notification. The existence of the sensor device 102 means that the communication is maintained between the network camera 101 and the sensor device 102. On the other hand, the non-existence of the sensor device 102 means that the communication is not maintained between the network camera 101 and the sensor device 102. The network camera 101 refers to the table 300 illustrated in FIG. 3 regarding the wakeup time of the sensor device 102. More specifically, the network camera 101 can calculate the timing at which the sensor device 102 will wake up next by adding the value of the Wake Interval 305 to the value of the Last Wake Time 306 of the device corresponding to the sensor device 102.

In step P502, the sensor device 102 transitions from the Sleep state to the Wake state when the Wake Interval set by the network camera 101 is reached. In step C501, the sensor device 102 transmits the Wake notification to the network camera 101 to notify the network camera 101 of the existence of the sensor device 102 itself. Upon receiving the Wake notification, the network camera 101 confirms that the sensor device 102 exists. After transmitting the Wake notification, the sensor device 102 returns to the Sleep state.

When replacing the sensor device 102 with the sensor device 103, the user should initialize and recover the sensor device 102 targeted for the replacement in advance before performing a replacement operation in step P503, which will be described below. In the present exemplary embodiment, assume that the initialization and the recovery of the sensor device 102 are normally carried out during a time period from step P502 to step P503, which will be described below.

Next, in step P503, the replacement operation is performed on the network camera 101 to replace the sensor device 102 with the sensor device 103. The user accesses the network camera 101 via a browser running on the information terminal 104, opens a setting screen on the network camera 101, and performs the replacement operation for instructing the network camera 101 to replace the slave device. The setting screen displayed on the browser of the information terminal 104 will be described below in detail with reference to FIG. 8. The slave device can be replaced when the slave device targeted for the replacement is in the Sleep state or the Dead state, but cannot be replaced when the slave device is in the Wake state. Therefore, the user is prohibited from performing the replacement operation on the setting screen displayed on the browser of the information terminal 104 in a case where the slave device targeted for the replacement is in the Wake state.

When the user performs the replacement operation via the browser of the information terminal 104, the network camera 101 serving as the master device enters a mode of registering the slave device for the replacement. In step P504, if the user presses a button on the sensor device 103 in this case, the sensor device 103 enters a mode for allowing the slave device to be registered with the master device (a Learning Mode). In this case, in step C502, communication called Inclusion is carried out between the network camera 101 serving as the master device and the sensor device 103 serving as the new slave device to register the device. More specifically, the same Node ID as the sensor device 102 serving as the old slave device is assigned to the sensor device 103 serving as the new slave device for the replacement of the slave device. Due to this processing, the communication information illustrated in FIG. 3 is transferred from the sensor device 102 to the sensor device 103.

In a case where the setting reflection mode of the sensor device 102 serving as the old slave device is the mode of reflection after the determination about the existence, the setting information illustrated in FIG. 4 is transferred to the new slave device after the non-existence of the old slave device is confirmed. When the setting reflection mode of the sensor device 102 serving as the old slave device is the immediate reflection mode, the setting information may also be transferred together with the communication information.

Upon completion of the Inclusion, in step C503, the network camera 101 and the sensor device 103 set the Wake Interval of the sensor device 103. The Wake Interval of the sensor device 103 is set to a timing not overlapping the Wake Interval of the sensor device 102. More specifically, the Wake Interval of the sensor device 103 is determined so a transmission timing at which the sensor device 102 transmits the Wake notification and a transmission timing at which the sensor device 103 transmits the Wake notification do not overlap. For example, if some process is missed out in the work such as the initialization and the recovery of the sensor device 102 when the sensor device is replaced, the master device may receive, in some cases, the Wake notification from the sensor device 102 serving as the old slave device even after the processing of C502 is performed. In this case, because the Node ID that used to be assigned to the sensor device 102 is reassigned to the sensor device 103, the master device cannot identify whether the transmission source of the received Wake notification is the sensor device 102 or the sensor device 103. As a consequence, when confirming whether the sensor device 102 exists for the transfer of the setting information, the master device may mistakenly determine that the sensor device 102 still exists based on receiving the Wake notification from the sensor device 103. On the other hand, by setting the Wake Interval in such a manner that the respective Wake Intervals do not overlap each other, the master device can identify which sensor device is associated with the Wake Interval corresponding to the period during which the Wake notification is received. After the Wake Interval is set, the sensor device 103 transitions to the Sleep state.

Next, in step P505, the network camera 101 confirms whether the sensor device 102 exists by waiting for the Wake notification in the period during which the sensor device 102 is supposed to transmit the next Wake notification. If the initialization and the recovery are correctly carried out for the sensor device 102 in and after step P502, in step P506, the Wake notification is not transmitted from the sensor device 102. Accordingly, the network camera 101 can determine that the sensor device 102 does not exist because the Wake notification is not received from the sensor device 102.

Next, in step P508, the network camera 101 confirms whether the sensor device 103 exists and causes the setting information to be transferred. First, in step P507, the sensor device 103 transitions to the Wake state based on the Wake Interval set in step C503. Then, in step C504, the sensor device 103 issues the Wake notification to the network camera 101.

Upon receiving the Wake notification from the sensor device 103 and confirming that the sensor device 103 exists and is in the Wake state, in step C505, the network camera 101 reflects the setting information illustrated in FIG. 4. More specifically, the network camera 101 sets the setting information of the sensor device 102 serving as the old slave device to the sensor device 103 serving as the new slave device. This setting allows the sensor device 103 to issue a similar notification according to a similar condition to the sensor device 102, thereby allowing the sensor device 103 to take over the role of the sensor device 102.

The network camera 101 can be prevented from receiving the notifications from both the new and old slave devices, by allowing the new sensor device to start the notification therefrom after confirming that the sensor device targeted for the replacement does not exist in this manner. As a result, the network camera 101 serving as the master device can be prevented from performing incorrect processing by performing the processing based on the notification received from the old slave device.

Figure 6:
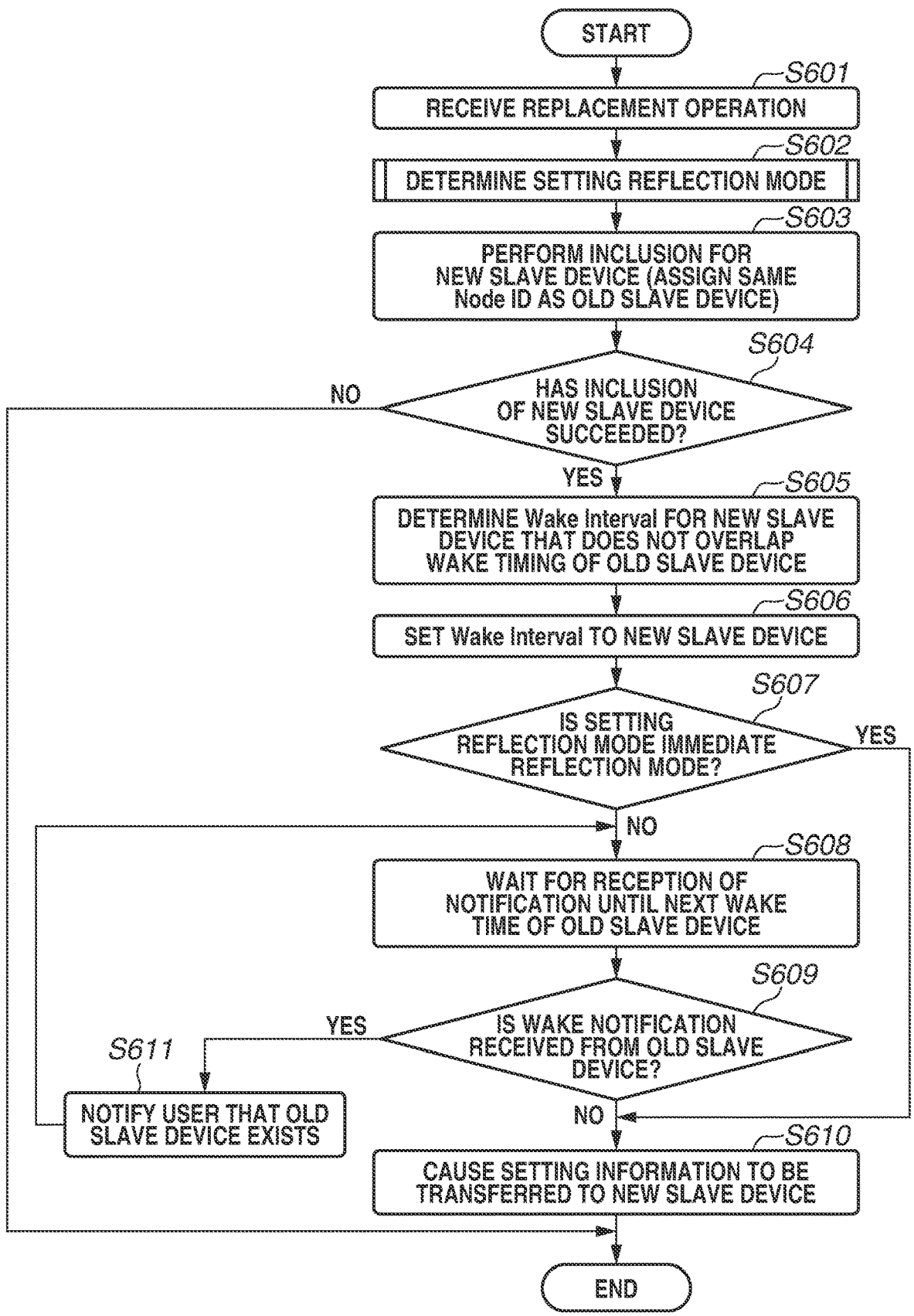
FIG. 6 is a flowchart illustrating the example of the processing performed by the network camera when the sensor device is replaced with the sensor device.

FIG. 6 is a flowchart illustrating processing realized by reading out the computer program stored in the storage unit 204 of the network camera 101 into the system control unit 203 and executing the program when the sensor device 102 is replaced with the sensor device 103.

The flowchart illustrated in FIG. 6 is started based on the fact that the setting screen is displayed via the browser of the information terminal 104. Alternatively, the flowchart illustrated in FIG. 6 is started based on the fact that the sensor device 102 serving as the slave device is registered with the network camera 101 serving as the master device.

First, in step S601, the network camera 101 serving as the master device receives the replacement operation from the user via the setting screen displayed on the browser of the information terminal 104.

Next, in step S602, the network camera 101 determines the setting reflection mode of the sensor device 102 targeted for the replacement. Details of this step will be described with reference to FIG. 7.

Figure 7:
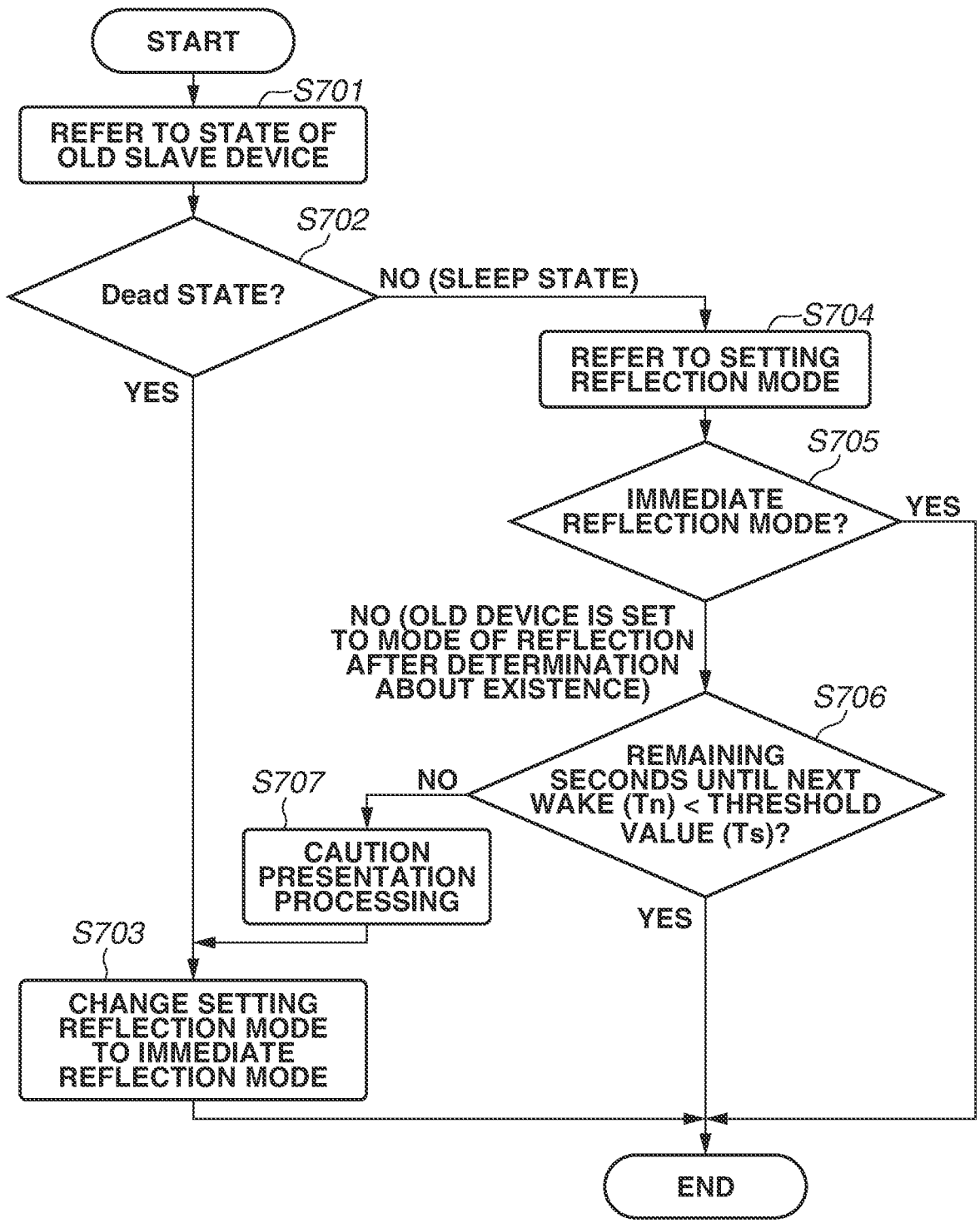
FIG. 7 is a flowchart illustrating an example of processing performed by the network camera in step S602 illustrated in FIG. 6.

FIG. 7 is a flowchart illustrating an example of processing performed by the network camera 101 in step S602.

In step S701, the network camera 101 refers to the state of the sensor device 102 serving as the old slave device. More specifically, the network camera 101 confirms the state of the old slave device by referring to the Device Status 303 associated with the Node ID 302 assigned to the sensor device 102 in the device management table 300 illustrated in FIG. 3.

In step S702, the network camera 101 confirms whether the state of the old slave device confirmed in step S701 is the Dead state. If the state of the sensor device 102 is the Dead state, the network camera 101 determines YES in step S702, and the processing proceeds to step S703. If the state of the sensor device 102 is not the Dead state, i.e., is the Sleep state, the network camera 101 determines NO in step S702, and the processing proceeds to step S704.

In step S703, the network camera 101 determines to set the immediate reflection mode as the setting reflection mode of the sensor device 102, because confirming that the state of the sensor 102 is the Dead state is equivalent to confirming that the sensor device 102 does not exist. In this case, the network camera 101 changes the setting reflection mode 307 to the immediate reflection mode if the setting reflection mode 307 associated with the Node ID 302 of the sensor device 102 is not the immediate reflection mode. After performing the processing of step S703, the network camera 101 ends the processing of the present flow.

On the other hand, if the state of the sensor device 102 is not the Dead state, i.e., is the Sleep state (NO in step S702), in step S704, the network camera 101 refers to the setting reflection mode. More specifically, the network camera 101 refers to the setting reflection mode 307 associated with the Node ID 302 assigned to the sensor device 102 in the device management table 300 illustrated in FIG. 3.

Subsequently, in step S705, the network camera 101 determines whether the setting reflection mode of the sensor device 102 referred to in step S704 is the immediate reflection mode. If the setting reflection mode of the sensor device 102 is the immediate reflection mode, the network camera 101 determines YES in step S705, and ends the processing of the present flow. On the other hand, if the setting reflection mode of the sensor device 102 is not the immediate reflection mode, i.e., is the mode of reflection after the determination about the existence or is not set yet, the network camera 101 determines NO in step S705, and the processing proceeds to step S706.

In step S706, the network camera 101 determines whether a remaining time period T(n) until the next Wake time of the old slave device is shorter than a predetermined threshold value (Ts). The predetermined threshold value (Ts) is preset to the network camera 101. Alternatively, the predetermined threshold value (Ts) may be set to an arbitrary threshold value by the user. If it is determined that the remaining time period (Tn) until the next Wake time of the old slave device is shorter than the predetermined threshold value (Ts), the network camera 101 determines YES in step S706, and ends the processing of the present flow. If the setting reflection mode of the sensor device 102 is not set yet, the network camera 101 determines YES in step S706 (YES in step S706), and, after that, sets the setting reflection mode of the sensor device 102 to the mode of reflection after the determination about the existence. On the other hand, if it is determined that the remaining time period (Tn) until the next Wake time of the old slave device is longer than the predetermined threshold value (Ts), the network camera 101 determines NO in step S706, and the processing proceeds to step S707.

In step S707, the network camera 101 performs caution presentation processing to present to the user that the setting information will be transferred to the new slave device without confirming the existence state of the old slave device. More specifically, the network camera 101 notifies the user that the setting information will be transferred to the new slave device without confirming the existence state of the old slave device via the setting screen displayed on the browser of the information terminal 104. After the network camera 101 performs the processing of step S707, the processing of the present flow proceeds to step S703.

In the present exemplary embodiment, the network camera 101 determines whether the remaining time period (Tn) until the next Wake time of the slave device targeted for the replacement is shorter than the predetermined threshold value (Ts), and sets the setting reflection mode to the mode of reflection after the determination about the existence if the remaining time (Tn) is shorter than the predetermined threshold value (Ts) and to the immediate reflection mode if the remaining time (Tn) is longer than the predetermined threshold value (Ts). In a case where the interval lasting until the old slave device transitions to the next Wake state is longer than the predetermined interval, the present configuration allows the network camera 101 to set the setting information to the new slave device without waiting for the confirmation of the existence of the old slave device, thereby allowing the network camera 101 to complete the processing for replacing the slave device without making the user wait so long. On the other hand, in a case where the interval lasting until the old slave device transitions to the next Wake state is shorter than the predetermined interval, the present configuration allows the network camera 101 to set the setting information to the new slave device after conforming whether the old slave device exists, thereby allowing the network camera 101 to prevent itself from receiving the notification from the old slave device after the notification from the new slave device is started.

The network camera 101 has been described as determining to set the immediate reflection mode as the setting reflection mode even in some cases when it is determined that the old slave device is not in the Dead state in step S702 (NO in step S702) in the present exemplary embodiment, but is not limited thereto. The network camera 101 may determine to set the setting reflection mode of the old slave device to the mode of reflection after the determination about the existence if it is determined NO in step S702 (NO in step S702).

The present exemplary embodiment will be further described, referring back to the description of FIG. 6. In step S603, the network camera 101 enters the mode of registering the slave device for the replacement, and carries out the Inclusion for the sensor device 103 serving as the new slave device. More specifically, the network camera 101 serving as the master device assigns the same Node ID as the sensor device 102 serving as the old slave device to the sensor device 103 serving as the new slave device, and transfers the communication setting to the sensor device 103 transferred, as described with reference to FIG. 5. When the communication setting of the old slave device is transferred to the new slave device, the network camera 101 stores the Time Interval and the last Wake time of the old slave device in advance.

Next, in step S604, the network camera 101 determines whether the Inclusion has succeeded. More specifically, after entering the mode of registering the slave device for the replacement in step S603, the network camera 101 determines YES in step S604, if the network camera 101 receives a request for the registration from the new slave device and succeeds in assigning the same Node ID as the old slave device. On the other hand, after entering the mode of registering the slave device for the replacement in step S603, the network camera 101 determines NO in step S604, if the network camera 101 does not receive the request for the registration from the new slave device within a predetermined time period. Alternatively, after entering the mode of registering the slave device for the replacement in step S603, the network camera 101 determines NO in step S604, if the network camera 101 fails to cause the Node ID of the old slave device to be transferred to the new slave device within the predetermined time period. If it is determined NO in step S604, the network camera 101 ends the processing of the present flow. On the other hand, if the network camera 101 determines YES in step S604, the processing proceeds to step S605.

If the Inclusion has succeeded (YES in step S604), in step S605, the network camera 101 determines the Wake Interval of the sensor device 103 serving as the new slave device. The Wake Interval of the sensor device 103 serving as the new slave device is set so as not to overlap the Wake Interval of the sensor device 102 serving as the old slave device. More specifically, the network camera 101 calculates the Wake Interval value of the new slave device based on the Wake Interval of the old slave device. For example, the network camera 101 first acquires the next Wake time of the old slave device based on the last Wake time and the Wake Interval of the old slave device. Then, the network camera 101 adds the predetermined time period to the time period from the current time to the next Wake time of the old slave device, and determines to set the time period calculated in this manner as the Wake Interval of the new slave device. By determining the Wake Interval of the new slave device based on the Wake Interval of the old slave device in this manner, the overlap between the respective periods during which the old slave device and the new slave device are in the Wake state can be prevented. The network camera 101 may be configured to set a new Wake Interval again after ending the processing of the present flow, using the Wake Interval of the sensor device 103 set in the present step as a temporary setting. For example, the network camera 101 may set the Wake Interval again in such a manner that the sensor device 103 is kept in the Sleep state during a longer interval than the Wake interval set in the present step with the aim of improving a power saving performance of the sensor device 103.

Next, in step S606, the network camera 101 sets the Wake Interval determined in step S605 to the new slave device. More specifically, the network camera 101 and the sensor device 103 establish the communication described in step C503 illustrated in FIG. 5 therebetween, by which the sensor device 103 is notified of the Wake Interval by the network camera 101. Further, the network camera 101 updates the value of the Wake Interval 305 corresponding to the Node ID 302 assigned to the sensor device 103 with the value determined in step S605 in the device management table 300 (FIG. 3) stored in the network camera 101 itself.

Subsequently, in step S607, the network camera 101 determines whether the setting reflection mode determined in step S602 is the immediate reflection mode. If it is determined that the setting reflection mode determined in step S602 is the immediate reflection mode, the network camera 101 determines YES in step S607, and the processing proceeds to step S610. On the other hand, if it is determined that the setting reflection mode determined in step S602 is the mode of reflection after the determination about the existence, the network camera 101 determines NO in step S607, and the processing proceeds to step S608.

In step S608, the network camera 101 waits for receiving the Wake notification from the old slave device until the next Wake time of the old slave device. The next Wake time of the old slave device can be calculated by adding the Time Interval of the old slave device to the last Wake time of the old slave device.

In step S609, the network camera 101 determines whether the Wake notification is received when the next Wake time of the old slave device has come. If the Wake notification is received within the predetermined time period since the Wake time of the old slave device has come, the network camera 101 determines YES in step S609, and the processing proceeds to step S611. On the other hand, if it is determined that the Wake notification is not received by the time the predetermined time period has elapsed since the Wake time of the old slave device has come, the network camera 101 determines NO in step S609, and the processing proceeds to step S610.

If the Wake notification is received from the old slave device (YES in step S609), in step S611, the network camera 101 notifies the user that the old slave device still exists. More specifically, the network camera 101 notifies the user that the sensor device 102 serving as the old slave device still exists via the setting screen displayed on the browser of the information terminal 104. After the network camera 101 performs the processing of step S611, the processing of the present flow proceeds to step S608.

On the other hand, if the Wake notification is not received from the old slave device (NO in step S609), in step S610, the network camera 101 causes the setting information of the old slave device to be transferred to the new slave device, determining that the old slave device does not exist. More specifically, the network camera 101 notifies the sensor device 103 serving as the new slave device of the setting information associated with the Node ID transferred to the new slave device in step S603. This notification allows the sensor device 103 serving as the new slave device to issue the notification to the master device according to a similar condition to the sensor device 102 serving as the old slave device.

In the case where it is determined YES in step S607 and the processing proceeds to step S610, the network camera 101 is supposed to cause the setting information to be transferred to the sensor device 103 serving as the new slave device without confirming whether the sensor device 102 serving as the old slave device exists. Accordingly, the network camera 101 can notify the user so as to prompt the user to confirm the existence state of the old slave device via the setting screen after performing the processing of step S610 in such a case.

The master device can be prevented from receiving the notifications from both the old slave device and the new slave device by transferring the setting information to the new slave device after confirming that the old slave device does not exist as illustrated in FIG. 6. As a result, the master device can perform control based on the notification from the new slave device after confirming that the old slave device does not exist.

The network camera 101 serving as the master device may be configured not to perform the control based on the notification received from the old slave device since receiving the replacement operation in step S601 until transferring the setting information to the new slave device in step S610. More specifically, the network camera 101 does not perform the control based on the notification containing the same Node ID as the old slave device. As a result, the master device can be prevented from performing the control based on the notification from the old slave device while the processing for replacing the slave device is in progress.

FIG. 8 illustrates an example of a setting screen 800 regarding the network camera 101.

The setting screen 800 regarding the network camera 101 is displayed using the browser of the information terminal 104. The user can change the settings of the network camera 101 and the sensor device that communicates with the network camera 101 via the setting screen 800. Further, the user can issue an instruction for adding, deleting, and replacing the sensor device that communicates with the network camera 101 via the setting screen 800. Notifications addressed to the user regarding the network camera 101 and the sensor device that communicates with the network camera 101 are displayed on the setting screen 800.

A registered device list 801 displays a list of sensor devices that are the slave devices already registered with the network camera 101. When the already registered slave device is replaced with the new slave device, the processing for replacing the selected slave device is started by the user's selecting a radio button 802 corresponding to the name of the slave device targeted for the replacement so as to set the target slave device into a selected state and pressing a replace button 805. More specifically, when the replace button 805 is pressed, the network camera 101 enters the mode of registering the slave device for the replacement. However, if the state of the slave device corresponding to the radio button 802 set in the selected state is the Wake state, the selected slave device cannot be replaced and therefore the replace button 805 is grayed out to prohibit pressing thereof, thereby becoming non-reactive even when being pressed. If the replace button 805 is pressed with an immediately reflect operation setting box 806 selected, the setting reflection mode of the slave device targeted for the replacement is set to the immediate reflection mode.

Alternatively, when wanting to register the new slave device, the user presses an add button 803, by which the master device enters the mode of registering the new slave device. On the other hand, when wanting to delete the already registered slave device, the user selects the radio button 802 corresponding to the name of the slave device targeted for the deletion to set it into the selected state and presses a delete button 804, by which the communication information and the setting information regarding the selected slave device are deleted.

A message such as a result of the replacement operation and a caution to the user is displayed in a region of a result/status 807. A display message 808 is illustrated as an example of the notification indicating the existence of the old slave device that is displayed, for example, in step S611 illustrated in FIG. 6. Further, a display message 809 is illustrated as an example of the message notifying the user that the setting information will be transferred to the new slave device without confirming the existence state of the old slave device, for example, in step S707 illustrated in FIG. 7. Further, a display message 810 is illustrated as an example of the notification prompting the user to confirm the existence state of the old slave device, for example, when it is determined YES in step S607 illustrated in FIG. 6 and the processing proceeds to step S610. In this way, the network camera 101 can appropriately notify the user depending on the processing by displaying the message based on the fact that the existence of the old slave device is confirmed or based on the setting reflection mode of the old slave device when the slave device is replaced.

The setting screen 800 has been described as being displayed using the browser of the information terminal 104 in the present exemplary embodiment, but is not limited thereto. In a case where the network camera 101 includes a display unit that presents a display, the setting screen 800 may be displayed via this display unit. In this case, the display unit may be integrated with the network camera 101 or may be a separate member from the network camera 101. Further, the network camera 101 may also include an input unit that receives an input from the user, and the input unit may be integrated with the network camera 101 or may be a separate member from the network camera 101.

In the present exemplary embodiment, the setting information is transferred to the new slave device after the master device confirms that the old slave device does not exist, when the slave device is replaced. However, the present exemplary embodiment is not limited thereto, and may be modified in such a manner that the notification from the new slave device is prohibited until the master device confirms that the old slave device does not exist after the setting information is transferred to the new slave device, when the slave device is replaced. More specifically, the present exemplary embodiment may be modified in such a manner that the setting information is also transferred at the same time when the communication information is transferred to the new slave device by the Inclusion in step C502 in the flowchart illustrated in FIG. 5. Then, the notification from the new slave device is stopped by transmitting a stop signal indicating the stop of the notification from the master device to the new slave device. After the notification from the new slave device is stopped, the master device conducts the confirmation of the existence of the old slave device and confirms that the old slave device does not exist, and transmits a start signal instructing the new slave device to start the notification to the new slave device after that. As a result, the master device can cause the notification from the new slave device to be started after confirming that the old slave device does not exist, when the slave device is replaced.

The network camera 101, the sensor device 102, and the sensor device 103 have been described as communicating with each other via the wireless communication in compliance with the Z-Wave standard and replacing the sensor device by the method in compliance with the Z-Wave standard in the present exemplary embodiment, but are not limited thereto. The network camera 101 and each of the sensor devices 102 and 103 may communicate with each other via wireless communication in compliance with another communication standard, and the communication method is not limited to the above-described example as long as each of the sensor devices 102 and 103 can issue the notification to the network camera 101 based on the preset condition. Further, the communication method is not limited to the above-described example as long as the network camera 101 and each of the sensor devices 102 and 103 can achieve the replacement of the sensor device by a method in compliance with another communication standard, and another communication method may be employed as long as at least one of the communication information and the setting information of the old sensor device can be transferred to the new sensor device.

At least a part or all of the flowcharts of the network camera 101 illustrated in FIGS. 6 and 7 may be realized by hardware. In the case where these flowcharts are realized by hardware, this can be achieved by, for example, generating a dedicated circuit on a field programmable gate array (FPGA) from a computer program for realizing each step using a predetermined compiler, and utilizing it. Alternatively, the network camera 101 may be configured in such a manner that these flowcharts are realized as hardware by forming a gate array circuit in a similar manner to the FPGA. Alternatively, the network camera 101 may be configured in such a manner that these flowcharts are realized by an application specific integrated circuit (ASIC).

Similarly, at least a part or whole of the sequence diagram of the network camera 101 illustrated in FIG. 5 may be realized by hardware. In the case where this sequence diagram is realized by hardware, this can be achieved by, for example, generating a dedicated circuit on an FPGA from a computer program for realizing each step using a predetermined compiler, and utilizing it. Alternatively, the network camera 101 may be configured in such a manner that this sequence diagram is realized as hardware by forming a gate array circuit in a similar manner to the FPGA. Alternatively, the network camera 101 may be configured in such a manner that this sequence diagram is realized by an ASIC.

According to the present invention, the communication apparatus can be prevented from receiving the notification from the first other communication apparatus when the first other communication apparatus in communication with the communication apparatus is replaced with the second other communication apparatus and the notification from the second other communication apparatus is started.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-101147, filed May 30, 2019, which is hereby incorporated by reference herein in its entirety.

What is claimed is:

1. A communication apparatus comprising:
one or more memories storing instructions; and
one or more processors which, when executing the instructions, causes the communication apparatus to function as:
a first reception unit configured to receive a notification based on setting information from a first other communication apparatus in communication with the communication apparatus;
a confirmation unit configured to confirm whether the communication with the first other communication apparatus is maintained; and
a control unit configured to, in a case where the first other communication apparatus is replaced with a second other communication apparatus different from the first other communication apparatus, perform control in such a manner that the second other communication apparatus can start a notification based on the setting information based on the confirmation unit confirming that the communication with the first other communication apparatus is not maintained; and
a second reception unit configured to receive a first signal transmitted from the first other communication apparatus every first predetermined cycle,
wherein, in a case where the first other communication apparatus is replaced with the second other communication apparatus, the confirmation unit confirms that the communication with the first other communication apparatus is maintained based on the first signal being received by the second reception unit.

2. The communication apparatus according to claim 1, wherein, in a case where the first other communication apparatus is replaced with the second other communication apparatus, the control unit performs control in such a manner that the setting information is set to the second other communication apparatus based on the confirmation unit confirming that the communication with the first other communication apparatus is not maintained.

3. The communication apparatus according to claim 1, wherein the one or more processors, when executing the instructions, further cause the communication apparatus to function as a notification unit configured to, in a case where the first other communication apparatus is replaced with the second other communication apparatus, notify a user that the communication with the first other communication apparatus is maintained based on the confirmation unit confirming that the communication with the first other communication apparatus is maintained.

4. The communication apparatus according to claim 1, wherein, in a case where the first other communication apparatus is replaced with the second other communication apparatus, the control unit performs control in such a manner that the second other communication apparatus can start the notification based on the setting information based on the first signal not being received by the second reception unit even when the first predetermined cycle has completed.

5. The communication apparatus according to claim 1, wherein, in a case where an instruction to replace the first other communication apparatus with the second other communication apparatus is issued in a state where the communication with the first other communication apparatus is not maintained, the control unit performs control in such a manner that the second other communication apparatus can start the notification based on the setting information without the confirmation conducted by the confirmation unit.

6. The communication apparatus according to claim 1, wherein the one or more processors, when executing the instructions, further cause the communication apparatus to function as a determination unit configured to determine whether a time period until the first predetermined cycle of the first other communication apparatus is completed is shorter than a predetermined time period,
wherein the communication apparatus conducts the confirmation by the confirmation unit in a case where the determination unit determines that the time period until the first predetermined cycle is completed is shorter than the predetermined time period, and do not conduct the confirmation by the confirmation unit in a case where the determination unit determines that the time period until the first predetermined cycle is completed is longer than the predetermined time period.

7. The communication apparatus according to claim 1, wherein the one or more processors, when executing the instructions, further cause the communication apparatus to function as a determining unit configured to, in a case where the first other communication apparatus is replaced with the second other communication apparatus, determine a second predetermined cycle in such a manner that a transmission timing of a second signal transmitted from the second other communication apparatus every second predetermined cycle does not overlap a transmission timing of the first signal transmitted every first predetermined cycle.

8. The communication apparatus according to claim 1, wherein the setting information includes information indicating a condition based on which the first other communication apparatus issues the notification to the communication apparatus.

9. The communication apparatus according to claim 1, wherein the one or more processors, when executing the instructions, further cause the communication apparatus to function as an assignment unit configured to, in a case where the first other communication apparatus is replaced with the second other communication apparatus, assign an identification (ID) for identifying the first other communication apparatus as an ID for identifying the second other communication apparatus, wherein the control unit performs control in such a manner that, after the assignment unit assigns the ID, the second other communication apparatus can start the notification based on the setting information, based on the confirmation unit confirming that the communication with the first other communication apparatus is not maintained.

10. The communication apparatus according to claim 1, wherein the communication apparatus stores information indicating any one of a first state, a second state, and a third state as information indicating a state of the first other communication apparatus, the first state indicating that the first other communication apparatus can communicate with the communication apparatus, the second state indicating that the first other communication apparatus cannot communicate with the communication apparatus temporarily, the third state indicating that the communication with the first other communication apparatus is not maintained.

11. The communication apparatus according to claim 10, wherein the communication apparatus cannot replace the first other communication apparatus with the second other communication apparatus in a case where the first other communication apparatus is in the first state, and can replace the first other communication apparatus with the second other communication apparatus in a case where the first other communication apparatus is in the second state or the third state.

12. The communication apparatus according to claim 1, wherein the communication apparatus communicates with the first other communication apparatus and the second other communication apparatus via wireless communication in compliance with the Z-Wave standard.

13. A method for controlling a communication apparatus comprising:
receiving a notification based on setting information from a first other communication apparatus in communication with the communication apparatus;
confirming whether the communication with the first other communication apparatus is maintained;
performing control in such a manner that a second other communication apparatus can start a notification based on the setting information based on it being confirmed in the confirming that the communication with the first other communication apparatus is not maintained, in a case where the first other communication apparatus is replaced with the second other communication apparatus different from the first other communication apparatus; and
receiving a first signal transmitted from the first other communication apparatus every first predetermined cycle,
wherein, in a case where the first other communication apparatus is replaced with the second other communication apparatus, the confirming confirms that the communication with the first other communication apparatus is maintained based on the first signal being received by the communication apparatus.

14. A non-transitory computer-readable storage medium storing a computer program for causing a computer to execute a control method of a communication apparatus, comprising:
receiving a notification based on setting information from a first other communication apparatus in communication with the communication apparatus;
confirming whether the communication with the first other communication apparatus is maintained;
performing control in such a manner that a second other communication apparatus can start a notification based on the setting information based it being confirmed in the confirming that the communication with the first other communication apparatus is not maintained, in a case where the first other communication apparatus is replaced with the second other communication apparatus different from the first other communication apparatus; and
receiving a first signal transmitted from the first other communication apparatus every first predetermined cycle,
wherein, in a case where the first other communication apparatus is replaced with the second other communication apparatus, the confirming confirms that the communication with the first other communication apparatus is maintained based on the first signal being received by the communication apparatus.

15. A communication apparatus comprising:
one or more memories storing instructions; and
one or more processors which, when executing the instructions, causes the communication apparatus to function as:
a first reception unit configured to receive a notification based on setting information from a first other communication apparatus in communication with the communication apparatus;
a confirmation unit configured to confirm whether the communication with the first other communication apparatus is maintained; and
a control unit configured to, in a case where the first other communication apparatus is replaced with a second other communication apparatus different from the first other communication apparatus, perform control in such a manner that the second other communication apparatus can start a notification based on the setting information based on the confirmation unit confirming that the communication with the first other communication apparatus is not maintained,
wherein the communication apparatus stores information indicating any one of a first state, a second state, and a third state as information indicating a state of the first other communication apparatus, the first state indicating that the first other communication apparatus can communicate with the communication apparatus, the second state indicating that the first other communication apparatus cannot communicate with the communication apparatus temporarily, the third state indicating that the communication with the first other communication apparatus is not maintained,
wherein the communication apparatus cannot replace the first other communication apparatus with the second other communication apparatus in a case where the first other communication apparatus is in the first state, and can replace the first other communication apparatus with the second other communication apparatus in a case where the first other communication apparatus is in the second state or the third state.

16. A method for controlling a communication apparatus comprising:
receiving, at a computing device, a notification based on setting information from a first other communication apparatus in communication with the communication apparatus;
confirming whether the communication with the first other communication apparatus is maintained; and in a case where the first other communication apparatus is replaced with a second other communication apparatus different from the first other communication apparatus, performing control in such a manner that the second other communication apparatus can start a notification based on the setting information based on it being confirmed that the communication with the first other communication apparatus is not maintained, wherein the communication apparatus stores information indicating any one of a first state, a second state, and a third state as information indicating a state of the first other communication apparatus, the first state indicating that the first other communication apparatus can communicate with the communication apparatus, the second state indicating that the first other communication apparatus cannot communicate with the communication apparatus temporarily, the third state indicating that the communication with the first other communication apparatus is not maintained, wherein the communication apparatus cannot replace the first other communication apparatus with the second other communication apparatus in a case where the first other communication apparatus is in the first state, and can replace the first other communication apparatus with the second other communication apparatus in a case where the first other communication apparatus is in the second state or the third state.

17. A non-transitory computer-readable storage medium storing a computer program for causing a computer to execute a control method of a communication apparatus, comprising:

receiving a notification based on setting information from a first other communication apparatus in communication with the communication apparatus;

confirming whether the communication with the first other communication apparatus is maintained; and in a case where the first other communication apparatus is replaced with a second other communication apparatus different from the first other communication apparatus, performing control in such a manner that the second other communication apparatus can start a notification based on the setting information based on it being the confirmed that the communication with the first other communication apparatus is not maintained, wherein the communication apparatus stores information indicating any one of a first state, a second state, and a third state as information indicating a state of the first other communication apparatus, the first state indicating that the first other communication apparatus can communicate with the communication apparatus, the second state indicating that the first other communication apparatus cannot communicate with the communication apparatus temporarily, the third state indicating that the communication with the first other communication apparatus is not maintained, wherein the communication apparatus cannot replace the first other communication apparatus with the second other communication apparatus in a case where the first other communication apparatus is in the first state, and can replace the first other communication apparatus with the second other communication apparatus in a case where the first other communication apparatus is in the second state or the third state.

\* \* \* \* \*